(12) United States Patent
Xiong et al.

(10) Patent No.: US 11,030,454 B1
(45) Date of Patent: Jun. 8, 2021

(54) VIRTUAL OBJECT MACHINE LEARNING

(71) Applicant: Snap Inc., Santa Monica, CA (US)

(72) Inventors: Xuehan Xiong, Los Angeles, CA (US); Zehao Xue, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/777,098

(22) Filed: Jan. 30, 2020

Related U.S. Application Data

(63) Continuation of application No. 15/653,186, filed on Jul. 18, 2017, now Pat. No. 10,579,869.

(51) Int. Cl.
*G06K 9/00* (2006.01)
*G06N 20/00* (2019.01)
*G06T 17/20* (2006.01)

(52) U.S. Cl.
CPC ......... *G06K 9/00577* (2013.01); *G06N 20/00* (2019.01); *G06T 17/20* (2013.01)

(58) Field of Classification Search
CPC ........... G06K 9/00362; G06K 9/00577; G06K 9/4604; G06K 9/00355; G06K 9/00369; G06N 20/00; G06T 17/20; G06T 2200/04
USPC ........................................................ 382/225
See application file for complete search history.

(56) References Cited

U.S. PATENT DOCUMENTS

| | | | | |
|---|---|---|---|---|
| 8,213,680 B2 * | 7/2012 | Fitzgibbon | ......... | G06K 9/00335 382/103 |
| 9,892,311 B2 * | 2/2018 | Kusens | ............... | G06K 9/00208 |
| 10,033,686 B2 * | 7/2018 | Pesavento | .......... | G06Q 30/0269 |
| 10,163,271 B1 | 12/2018 | Powers et al. | | |
| 10,210,378 B2 * | 2/2019 | Kusens | .................... | H04N 7/18 |
| 10,579,869 B1 | 3/2020 | Xiong et al. | | |
| 2013/0100132 A1 | 4/2013 | Katayama et al. | | |
| 2015/0138063 A1 | 5/2015 | Cao et al. | | |
| 2016/0335790 A1 * | 11/2016 | Fleishman | ......... | G06K 9/00355 |
| 2017/0038851 A1 | 2/2017 | Menath | | |
| 2017/0287196 A1 | 10/2017 | Raeburn et al. | | |
| 2019/0026956 A1 * | 1/2019 | Gausebeck | ............. | G06T 7/579 |

OTHER PUBLICATIONS

"U.S. Appl. No. 15/653,186, Final Office Action dated Jul. 8, 2019", 13 pgs.
"U.S. Appl. No. 15/653,186, Non Final Office Action dated Feb. 28, 2019", 13 pgs.
"U.S. Appl. No. 15/653,186, Notice of Allowance dated Oct. 24, 2019", 8 pgs.
"U.S. Appl. No. 15/653,186, Response filed May 28, 2019 to Non Final Office Action dated Feb. 28, 2019", 11 pgs.
"U.S. Appl. No. 15/653,186, Response filed Oct. 8, 2019 to Final Office Action dated Jul. 8, 2019", 8 pgs.

\* cited by examiner

*Primary Examiner* — Ali Bayat
(74) *Attorney, Agent, or Firm* — Schwegman Lundberg & Woessner, P.A.

(57) ABSTRACT

A machine learning scheme can be trained on a set of labeled training images of a subject in different poses, with different textures, and with different background environments. The label or marker data of the subject may be stored as metadata to a 3D model of the subject or rendered images of the subject. The machine learning scheme may be implemented as a supervised learning scheme that can automatically identify the labeled data to create a classification model. The classification model can classify a depicted subject in many different environments and arrangements (e.g., poses).

18 Claims, 16 Drawing Sheets

VIRTUAL OBJECT MACHINE LEARNING

PRIORITY CLAIM

This application is a continuation of and claims the benefit of priority of U.S. patent application Ser. No. 15/653,186, filed Jul. 18, 2017, which is hereby incorporated by reference herein in its entirety.

TECHNICAL FIELD

Embodiments of the present disclosure relate generally to machine learning and, more particularly, but not by way of limitation, to virtual object machine learning.

BACKGROUND

Machine learning schemes can be trained to classify objects using training data. For example, a support vector machine (SVM) can be trained on images of railroad tie-plates. After the SVM is trained, it can receive an image of a tie-plate and output a likelihood that the imaged tie-plate is of a given type.

BRIEF DESCRIPTION OF THE SEVERAL VIEWS OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
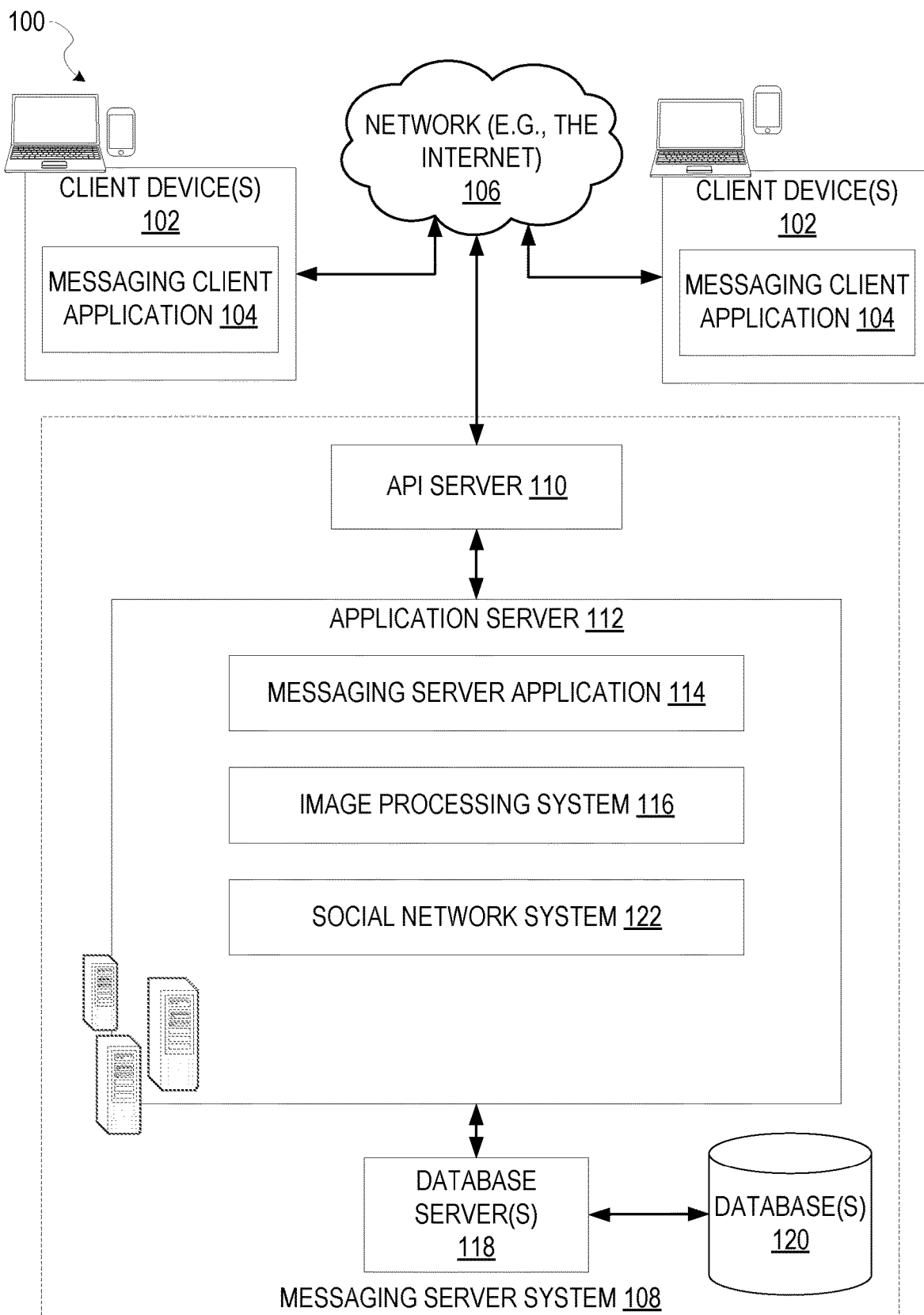
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Machine learning schemes can be trained to classify objects using training data. For example, a support vector machine (SVM) can be trained on images of railroad tie-plates. After the SVM is trained, it can receive an image of a tie-plate and output a likelihood that the imaged tie-plate is of a given type.

While machine learning schemes have performed well in classifying static or rigid items (e.g., tie-plates, hardware parts), it is far more difficult for a machine learning scheme to classify highly dynamic subjects. For example, using a machine learning scheme to classify a dog is difficult because a given dog can be of many different breeds, each having different coloration and fur type. Further, classifying how a given dog is posing (e.g., sitting, standing, tail up, tail down, ears up, ears down) is very complex as the coloration of dog fur, the fur-type, and the interplay between the environment lighting and its effect on the dog create a myriad of different training samples which a machine learning scheme must learn. To learn, the machine learning scheme is trained on training data. However, generating training images of different breeds of dog, with different colorations, with different fur-types, in different poses, in different lighting environments is not practical; at least due to the difficulty of controlling the imaged subjects (e.g., getting the subjects to the environments, posing the subjects, etc.).

Further compounding the problem is pre-processing the training data to ready it for machine learning. For some machine learning schemes (e.g., supervised learning schemes), the training data is manually labeled to aid in generating the machine learning model. For example, to create a set of training data for hand gesture recognition, a human labeler may go through each hand image in the training data and tag where the joints are located, where the ends of the fingers are located, etc. However, accurately (e.g., manually) tagging very large sets of data is not practical. Further, as mentioned above, the very large sets of data may not be feasible to create in the first place since it requires a myriad of subjects (e.g., different types of dogs or cats, different variations of humans) in different poses (e.g., gestures), in different lighting environments.

To this end, a virtual object machine learning system can use a synthetic set of training data to accurately classify highly dynamic subjects. The synthetic set of training data can be created using a 3D model of a subject, such as a human hand or a dog. The 3D model can be constructed using a rigging structure (e.g., bones, skeleton), thereby enabling key points to more easily be tracked. For example, a 3D human hand can be built around a skeleton, and the joints of the skeleton can be stored as metadata to the model.

The 3D model can be readily (e.g., programmatically) arranged into different poses, and in each pose, the key points will be tracked in the metadata. Further, textures (e.g., 3D model skins) can be readily applied to the 3D model to simulate different subject types (e.g., different colorations of a dog, different breeds of dog, different pigmentations of a human hand).

Further, the lighting environment can readily be controlled by applying different textures to a background surface, such as a sphere. Each point (e.g., pixel) in the background surface can be used to set lighting emanating from that point. Thus, different lighting environments (e.g., indoors, outdoors, street lights, laboratory lighting) can be readily managed. In this way, a very large set of labeled training images can be created and used to train a machine learning scheme. The trained machine learning scheme can then accurately classify depicted objects.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). In various embodiments, virtual machine learning can be used by messaging client application 104 and/or image processing system 116 to analyze images sent within the messaging system, and to use this analysis to provide features within the messaging system.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, include functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, image search, social network information, and live event information, as examples, some of which rely on information generated by analyzing images sent through the messaging system. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112. In some embodiments, databases 120 may also store results of image processing, or details of various trained and untrained support vector machines that may be used by messaging server system 118.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the addition and deletion of friends to and from a social graph; the location of friends within the social graph; and application events (e.g., relating to the messaging client application 104).

The application server 112 hosts a number of applications and subsystems, including the messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following", and also the identification of other entities and interests of a particular user.

The application server 112 is communicatively coupled to a database server 118, which facilitates access to a database 120 in which is stored data associated with messages processed by the messaging server application 114.

Figure 2:
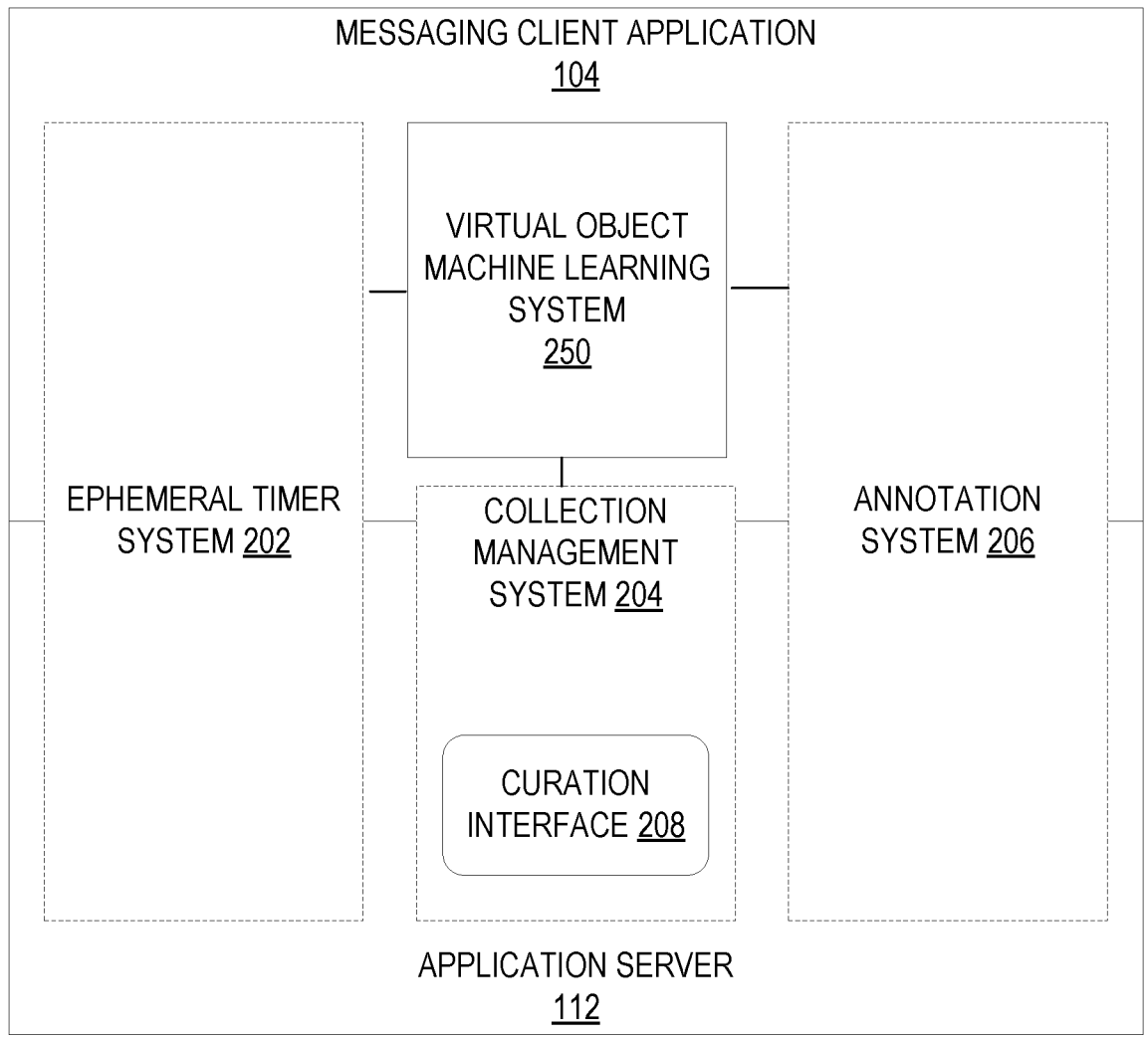
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a virtual object machine learning system 250. The virtual object machine learning system 250 is discussed in further detail below.

Further, although FIG. 2 shows the virtual object machine learning system 250 integrated into the message client application 104. In some example embodiments, the virtual object machine learning system 250 is integrated entirely within application server 112. Further, in some example embodiments, some of the engines of the virtual object machine learning system 250 are executed on a server (e.g., application server 112) and some of the engines of the virtual object machine learning system 250 are executed from the client device 102 (e.g., as part of client application 104). For example, an instance of the machine learning engine 630 (discussed below) may be trained to create a classifier model. The classifier model data can then be transferred to one or more client devices 102. On the one or more client devices 102, another instance of the machine learning engine 630 may apply the received classifier model to classify images captured on the respective client devices 102.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story". Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which particular content should be offered to other users. The annotation system 206 generates a media overlay that includes the uploaded content and associates the uploaded content with the selected geolocation.

Figure 3:
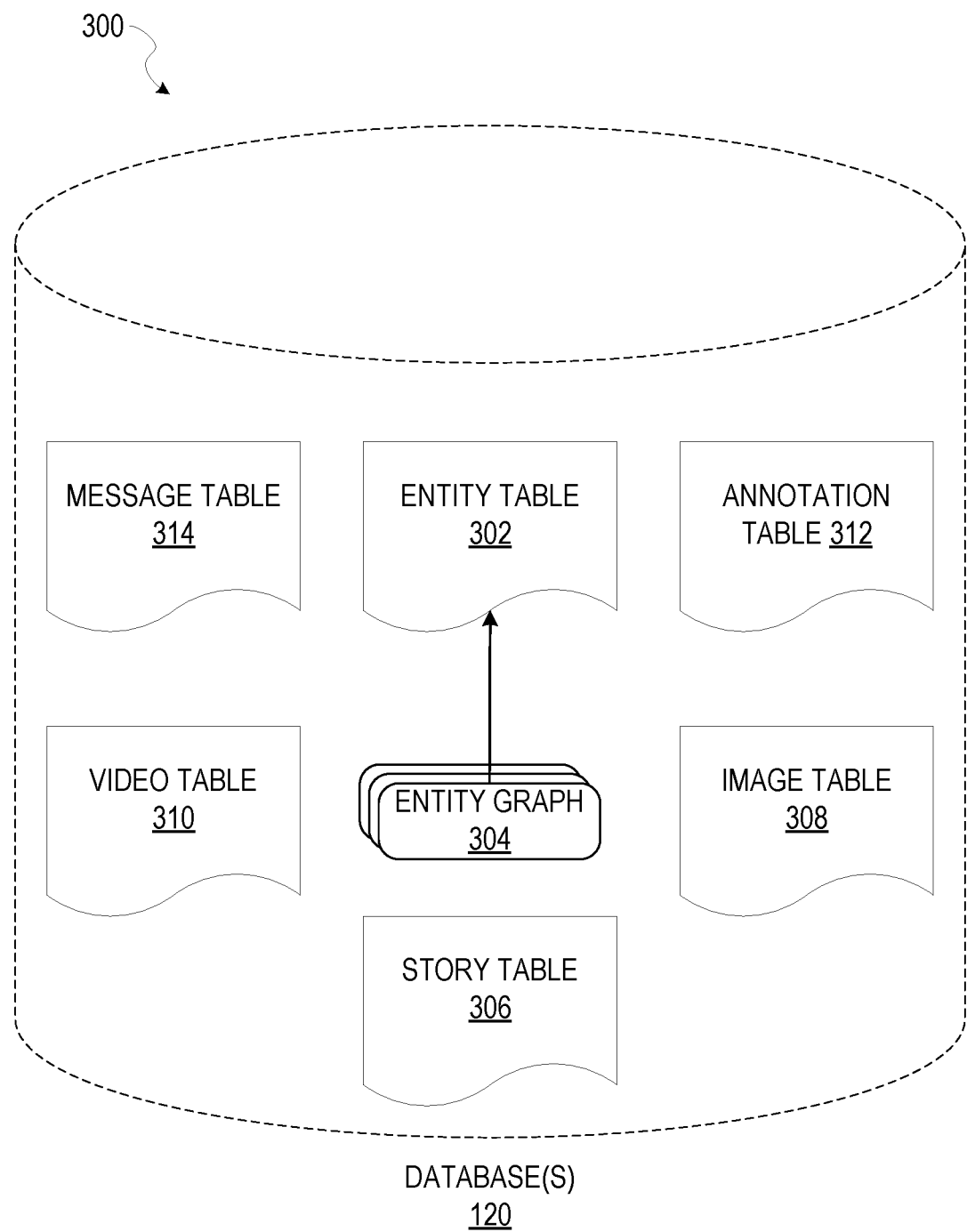
FIG. 3 is a schematic diagram illustrating data which may be stored in a database of a messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300 which may be stored in the database 120 of the messaging server system 108, according to certain example embodiments.

While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story", which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
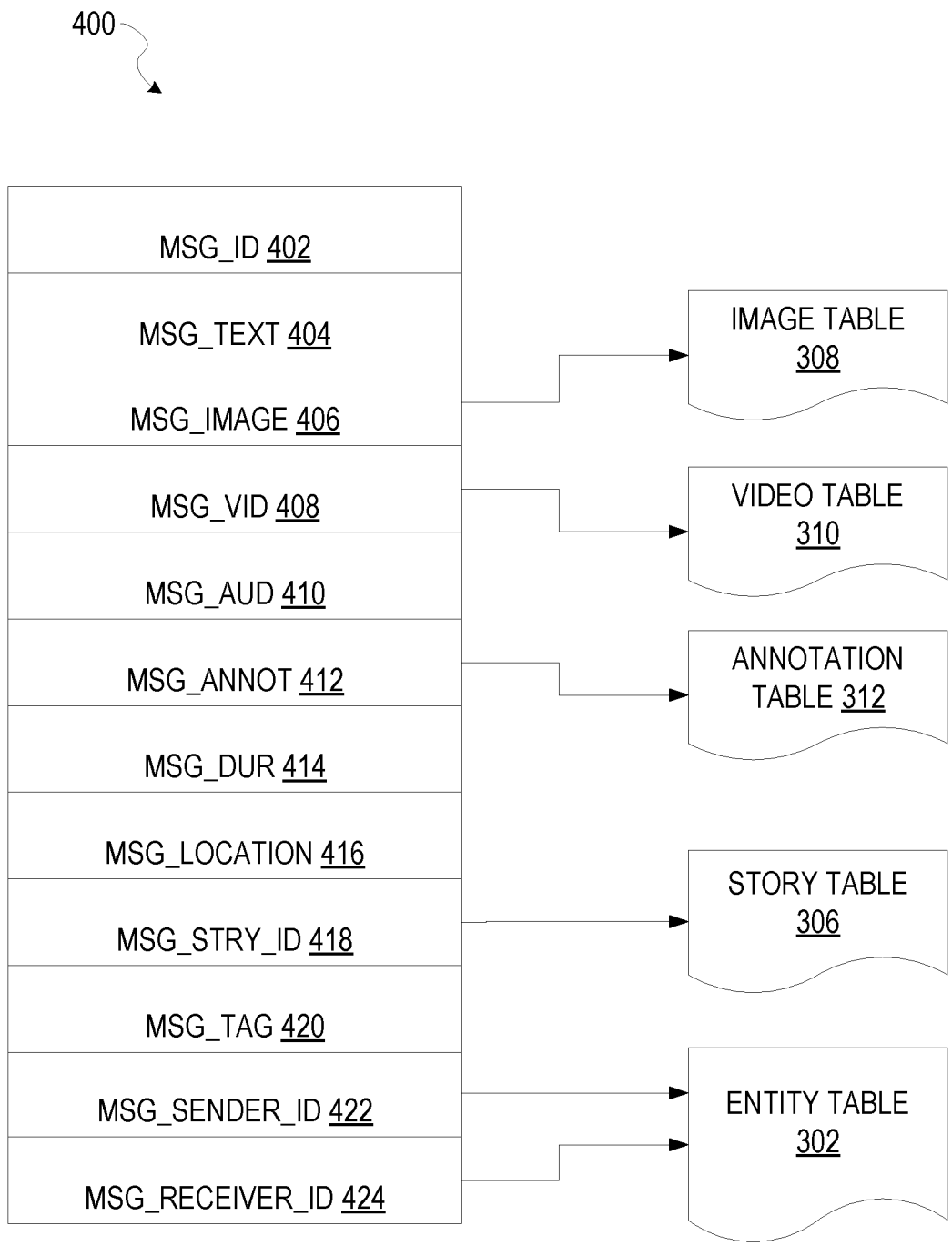
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400.

Multiple message geolocation parameter 416 values may be included in the payload, each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
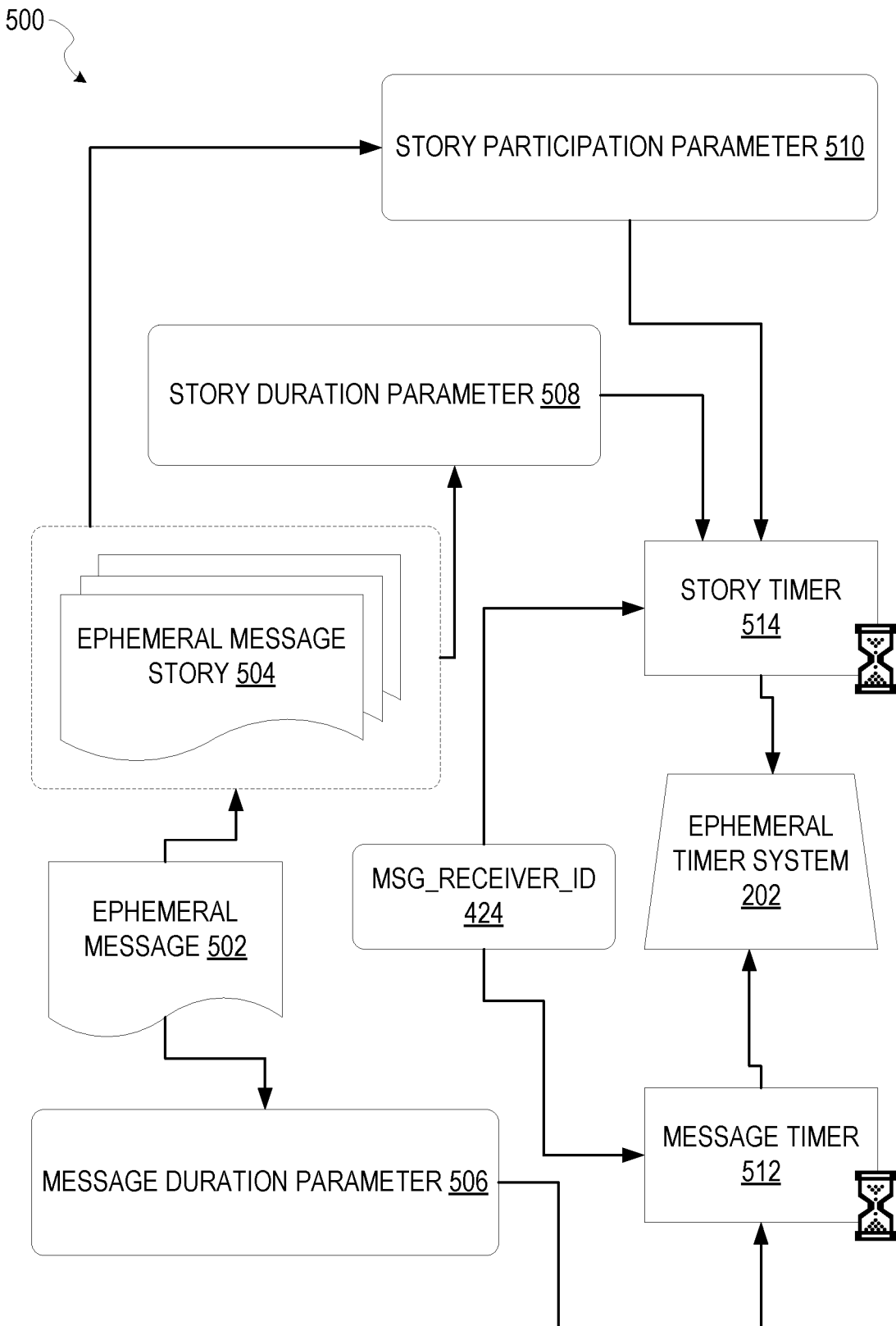
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
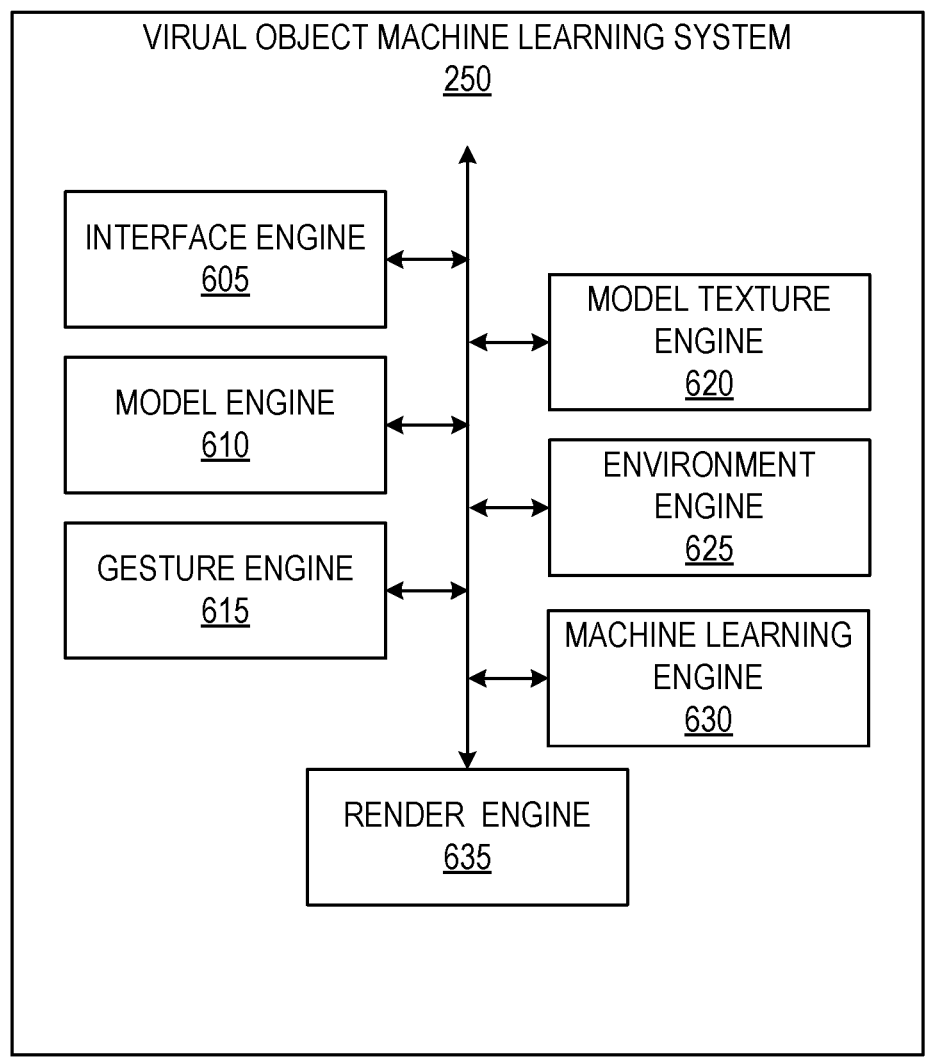
FIG. 6 shows a functional architecture for a virtual object machine learning system, according to some example embodiments.

FIG. 6 shows a functional architecture for a virtual object machine learning system 250, according to some example embodiments. As illustrated, the virtual object machine learning system 250 comprises an interface engine 605, a model engine 610, a gesture engine 615, a model texture engine 620, an environment engine 625, a machine learning engine 630, and a render engine 635.

The interface engine 605 is configured to receive images for classification. For example, the interface engine 605 may receive image or video data captured from an image capture sensor of the client device 102. The interface engine 605 may convey the image or video data to a machine learning scheme (e.g., machine learning engine 630) to detect a gesture of a hand depicted in the image or video data. The annotation system 206 may overlay content (e.g., message annotations 412) on the video or image data based on the detected hand gesture. For example, if the image or video data depicts a person making a peace sign with his/her fingers, the annotation system 206 may overlay words, such as "One Love" on the image or video data. The annotated message may then be published via social network system 122 for other users to view, according to some example embodiments.

The model engine 610 manages 3D model data of a subject to be classified. For example, the model engine 610 may manage 3D models of different sizes of hand, 3D models of different types of dogs (e.g., different breeds, ages) and so forth. The model engine 610 may select one of the 3D models to create a set of training data (e.g., images of a Labrador retriever) for training in one iteration, and another model for another set of training data (e.g., images of a pug) in another. Each model may be arranged in different poses, with different background and other variations to create a rich set of training data.

The gesture engine 615 is configured to change the arrangement of given 3D model. For example, the gesture engine 615 may programmatically arrange a model of a hand into a peace sign for one set of training images and then programmatically arrange the model of the hand into a thumbs-up gesture for another set of training images.

The model texture engine 620 is configured to change the texture of a given 3D model. For example, the model texture engine 620 may apply a brown texture to a Labrador retriever to create a set of images for a chocolate Labrador retriever, and then apply a black texture to a Labrador model to create another set of training images for a black Labrador retriever.

Then environment engine 625 is configured to control the 3D environment surrounding a given 3D model. For example, the environment engine 625 may programmatically change the texture of a spherical background that surrounds the 3D model. The texture may be a photo image of a real world environment such as a 360 image of the Grand Canyon in Arizona or a low-lit living room. The environment engine 625 is further configured to manage the lighting and virtual camera placements, according to some example embodiments.

The machine learning engine 630 is configured to train a machine learning scheme (e.g., support vector machine (SVM) scheme, logistic regression scheme, K-nearest neighbor scheme, convolutional neural networks) on the training data created from the 3D models. The machine learning engine 630 is further configured to receive an image or video data from the interface engine 605 and use the trained model to classify the type of object being depicted (e.g., dog, cat, human hand), and further classify the pose or gesture of the object being depicted in the image or video data.

The render engine 635 is configured to generate the training data by rendering the 3D model in the 3D environment, according to some example embodiments. The render engine 635 may further include instructions to loop over different types of models, gestures, model textures, and environment variables (e.g., textures, lighting, camera placements) to generate a multitude of combinations of training images, as discussed in further detail with reference to FIG. 8. The render engine 635 is further configured to store the training images in a memory location accessible to the training machine learning engine 630, according to some example embodiments.

Figure 7:
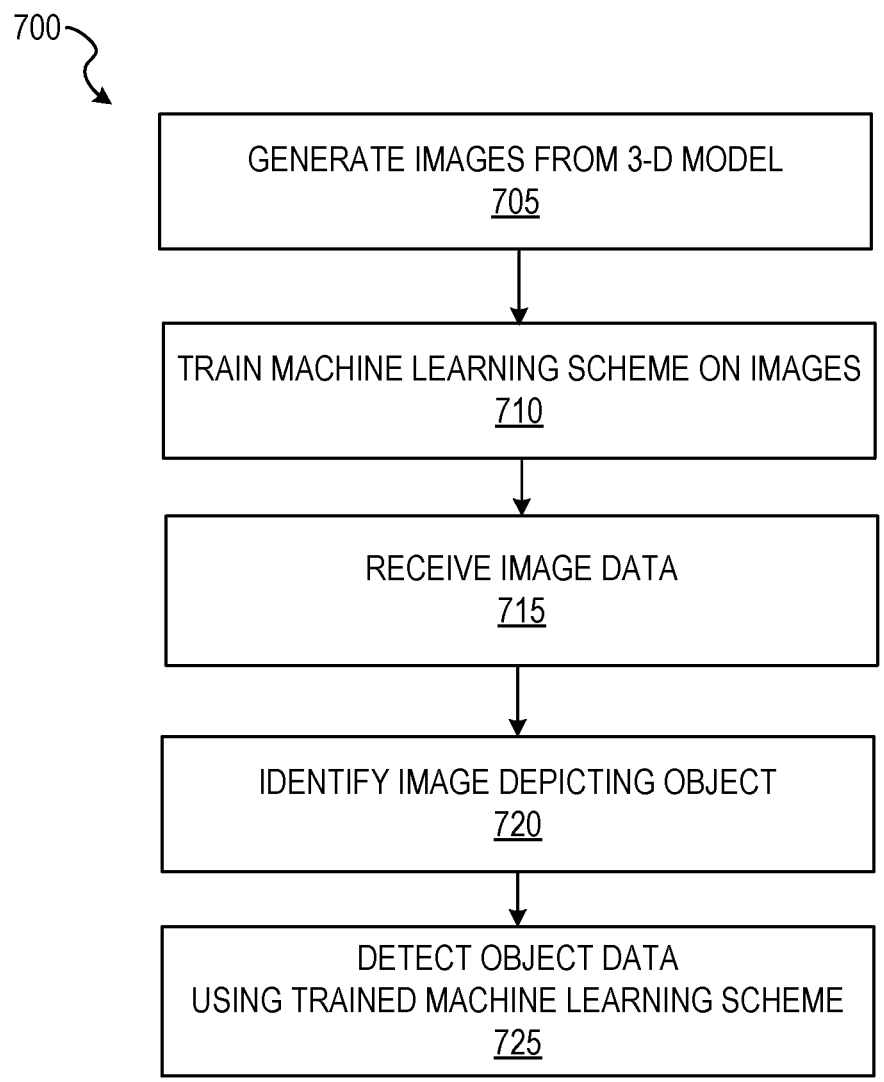
FIG. 7 shows a flow diagram of a method for implementing virtual object machine learning, according to some example embodiments.

FIG. 7 shows a flow diagram of a method 700 for implementing virtual object machine learning, according to some example embodiments. At operation 705, the render engine 635 generates training images from one or more 3D models. As discussed, the training images can be made by created renders of a 3D model having marker metadata. The 3D model can be rendered in different poses, in different lighting settings, and with different textures applied to the model and the background. The interplay of the different textures creates a unique set of images that the machine learning engine scheme can use to train itself to identify objects in a wide variety of scenarios.

At operation 710, machine learning engine 630 trains a machine learning scheme on the training images to generate a classifier model. The machine learning scheme can then classify objects by applying the trained classifier model on the objects. The output of the machine learning scheme is a numerical likelihood that the depicted object is of a given type, according to some example embodiments. In some example embodiments, the machine learning engine 630 is configured to use a supervised learning scheme (a learning scheme that generally requires labeled datasets) for training and classification. Example schemes include a support vector machine scheme, a K-nearest neighbor scheme, a supervised neural network (e.g., a neural network trained using labeled data markers), and other types of supervised schemes. Further, in some embodiments, the machine learning engine 630 may implement a non-supervised machine learning scheme such as k-means clustering and unsupervised neural networks.

At operation 715, the interface engine 605 receives image data (e.g. image or video data). For example, a client device 102 (e.g., smartphone) may capture an image of a hand and input the capture into the interface engine 605 for classification. At operation 720, the machine learning engine 630 identifies or otherwise detects key points of the object depicted in the received image. Example key points include joints, edges, intersections, prominences, and other visual data indicators that can be used to characterize an object.

At operation 725, the machine learning engine 630 detects object data using the key points. In some example embodiments, at operation 725 the machine learning engine 630 uses the key points to classify the object as being in a certain pose (e.g., a gesture). In some example embodiments, at operation 725 the machine learning engine 630 uses the keypoints to output pixel masking data for a depicted object. The pixel masking system can use the keypoints to more readily label parts of the depicted subject as one type area (e.g., a person's arms and legs)) or another type of area (e.g., the torso of the same person). For example, at operation 725, if the keypoints correspond to an arm, the surrounding area is masked as an arm area. Whereas if the keypoints belong to a torso area, the surrounding area is masked (labeled) as a torso area. Further details of an example approaches using image features are described in: U.S. Patent Application Ser. No. 62/481,415, titled "GENERATING A PIXEL MASK USING MACHINE LEARNING", filed on Apr. 4, 2017, which is hereby incorporated by reference in entirety. In some example embodiments, the location of the key points is output or otherwise stored in memory for use in another system (e.g., an augmented reality system), and operation 725 is not performed.

Figure 8:
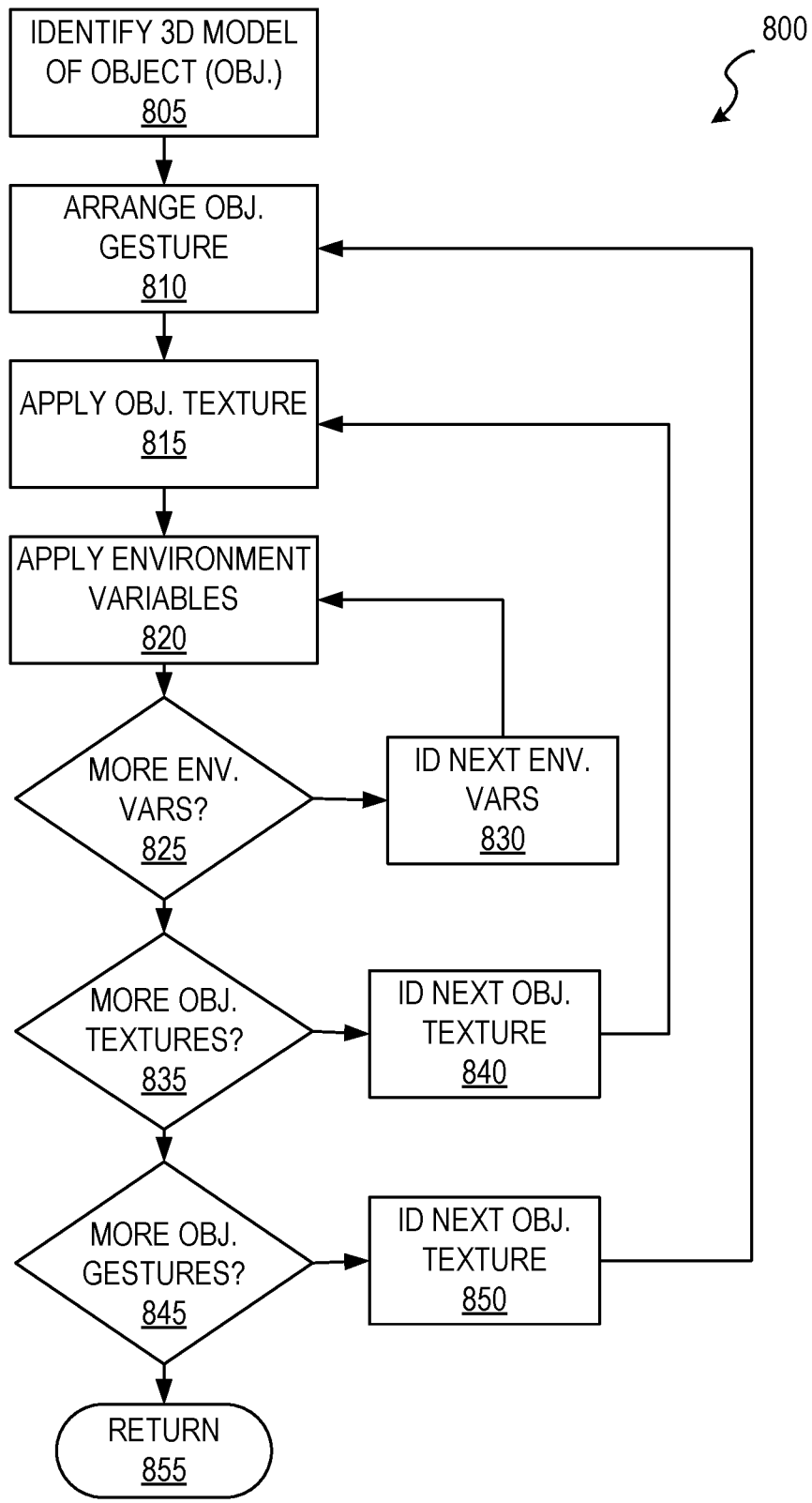
FIG. 8 shows a flow diagram of a method for generating training data, according to some example embodiments.

FIG. 8 shows a flow diagram of a method 800 for generating training data, according to some example embodiments. Although the method 800 is illustrated as three nested loop operations, it is appreciated that the different combinations can be achieved using other flow logic. Further, in some example embodiments, some of the operations may be completed manually instead of programmatically. For example, a human user may change the gesture of the 3D model manually, then apply the programmatic loops to the arranged 3D model to generate a set of training images. At operation 805, the model engine 610 identifies a 3D model of an object. For example, the model engine 610 identifies a 3D model of a hand (e.g., a 3D model file). At 810, the gesture engine 615 arranges the object into a gesture or pose. The gesture engine 615 may arrange the object into a pose within a 3D environment (e.g., application that creates a 3D environment in which a model can be arranged in virtual space). At operation 815, the model texture engine 620 applies a model texture to the model. The model texture may be the first of a collection. For example, the collection may be a collection of fur types and colors. At operation 820, environment engine 625 applies environment variables (e.g. background texture, lighting position and intensity, virtual camera placement). Examples of environment variables are further discussed below with reference to FIGS. 9 and 11.

At operation 825, the environment engine 625 determines whether there are additional sets of environment variables to apply. If there are additional sets of environment variables to apply, the method continues to operation 830. A different combination of variables may include changing the background image but keeping the camera positions, or changing the camera positions and the background. At operation 830, the environment engine 625 identifies a next set of environment variables to apply. The process then loops back to operation 820, where the environment engine 625 applies the new set of environment variables. Although not illustrated in FIG. 8, for every combination of variables, one or more virtual cameras may capture and store renders of the 3D model in the virtual environment.

Continuing, assuming there are no further environment variables, the method 800 continues from operation 825 to operation 835. At operation 835, the model texture engine 620 determines whether there are additional textures to apply to the model. If there are additional textures to apply to the model, the model texture engine 620 identifies the next object texture to apply to the model at operation 840. The method then continues to operation 815 where the model texture engine 620 applies the next texture to the model. The model with the new texture is then imaged with all of the backgrounds for the environment variables loop (operations 820, 825, and 830) as a nested loop operation.

Continuing from operation 835, assuming there are no additional object textures to apply to the model, the method 800 proceeds to operation 845, with a gesture engine 615 determines whether there are additional gestures to apply to the model. If there are more gestures to apply to the model, the method 800 continues to operation 850, where the next object gesture is identified. From operation 815 the method 800 continues to operation 810, where the gesture engine 615 applies the new gesture to the 3D model object. From operation 810, the method 800 continues to the nested loop operations of the object model textures and the nested loop of the environment variables. Returning to operation 845, if the there are no additional object gestures then the method 800 continues to operation 855, which may be an exit of the subroutine or storage of the training data.

Figure 9:
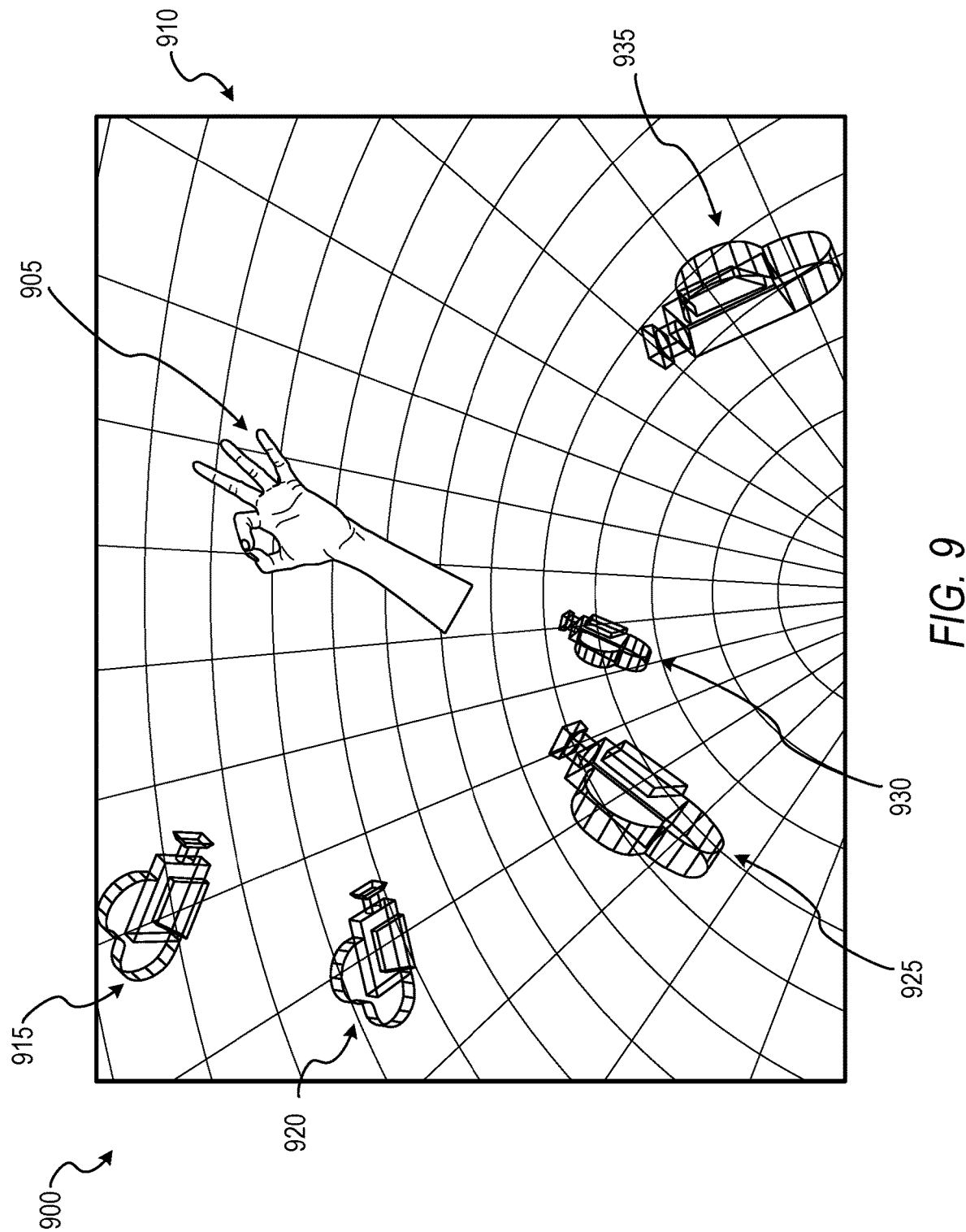
FIG. 9 shows an example rendering environment for generating training images, according to some example embodiments.

FIG. 9 shows an example rendering environment 900 for generating training images, according to some example embodiments. As illustrated, a 3D hand 905 is a virtual 3D model surrounded by a 3D environment 910 that curves around the 3D hand 905. In some example embodiments, the 3D environment 910 is a spherical portion or a complete sphere, with the 3D hand 905 inside the curving portion (e.g., inside the sphere). In some example embodiments, the background may be in other shapes, such as a flat plane. As depicted, the 3D hand 905 has been arranged into an "okay" sign gesture or pose. While in the gesture, one or more virtual cameras 915-935 may capture a rendering (e.g., output a 2-D image file) of the 3D hand 905 from different positions. The rendered 3D hand from different positions can be stored as different image files. The 3D environment may further have virtual light sources (not depicted) and a texture, which can be used to set light sources as discussed in further detail below with reference to FIG. 11.

Figure 10:
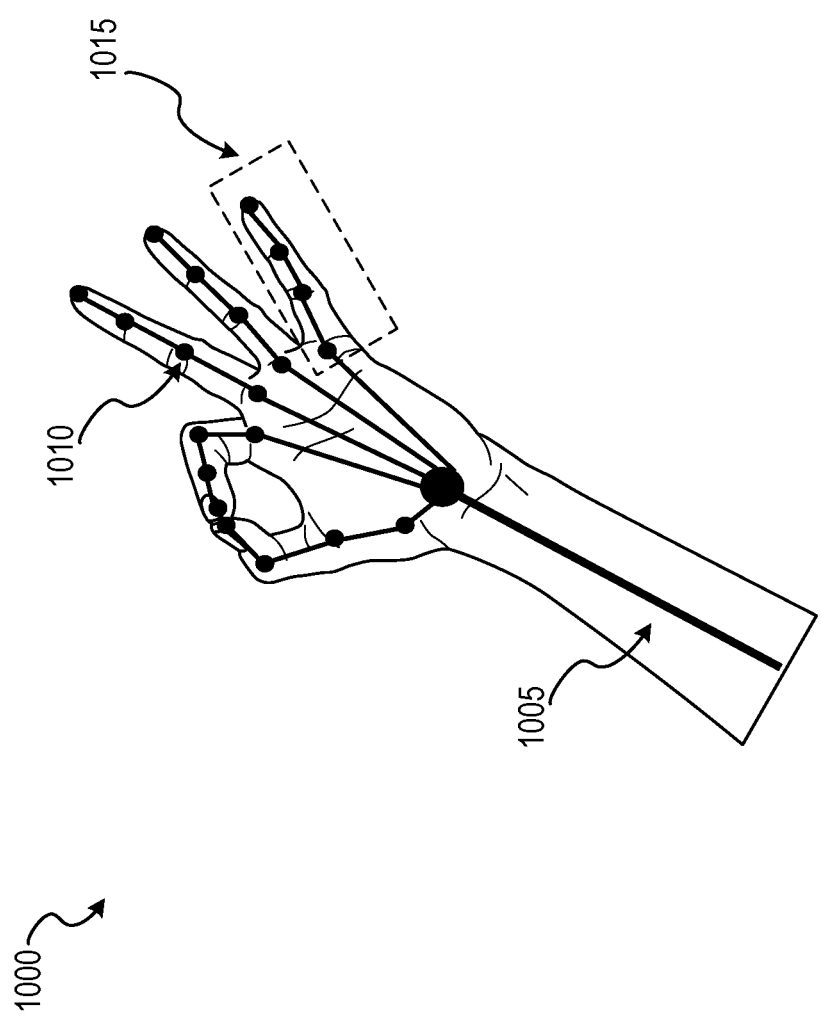
FIG. 10 shows example structure of a 3D hand, according to some example embodiments.

FIG. 10 shows an example structure of a 3D hand 1000, according to some example embodiments. The 3D hand 1000 may be generated using an underlying rigging structure 1005 (e.g., bones, skeleton). The key points are regions of interest (ROI) of a model that can be used to determine a 3D model's pose or gesture. For example, in the 3D hand 1000 the joints between different segments of the rigging structure 1005 can be used to determine that the 3D hand 1000 is making the "okay" sign gesture. The key points can be tracked using markers which are indicated in FIG. 10 by black solid circles. For example, the middle finger middle joint marker 1010 is black circle at the interface of two segments that correspond to one of the middle finger's knuckles. Other markers are likewise indicated in FIG. 10. The coordinates of the ROI markers in the image are stored as metadata with the 3D hand model. Further, when a 2D render of the 3D hand is created, the location of the markers can be stored as metadata to the 2D render or as a separate file that references the 2D render file. In some example embodiments, the keypoints are indicated using polygons that circumscribe or otherwise indicate a given type of area. For example, a pinky finger can be a key point indicated by a ROI polygon marker 1015. Other areas (e.g., fingers, palms, the entire hand) can be likewise tracked using ROI polygon markers. As discussed, the coordinates data (e.g., X any Y position within a given image of the markers (e.g., point based markers to indicate joints, polygons to indicate areas) can be stored as metadata for given image. The machine learning schemes can use the coordinate data as labels for supervised learning.

Markers can indicate key points other than joints, according to some example embodiments. For example, if a 3D model is a human face, the markers can indicate corners of the mouth, corners of the eyes, edges (e.g., the outline of a human lip, the outline of a dog, etc.), or prominences (e.g., high cheek bones).

Figure 11:
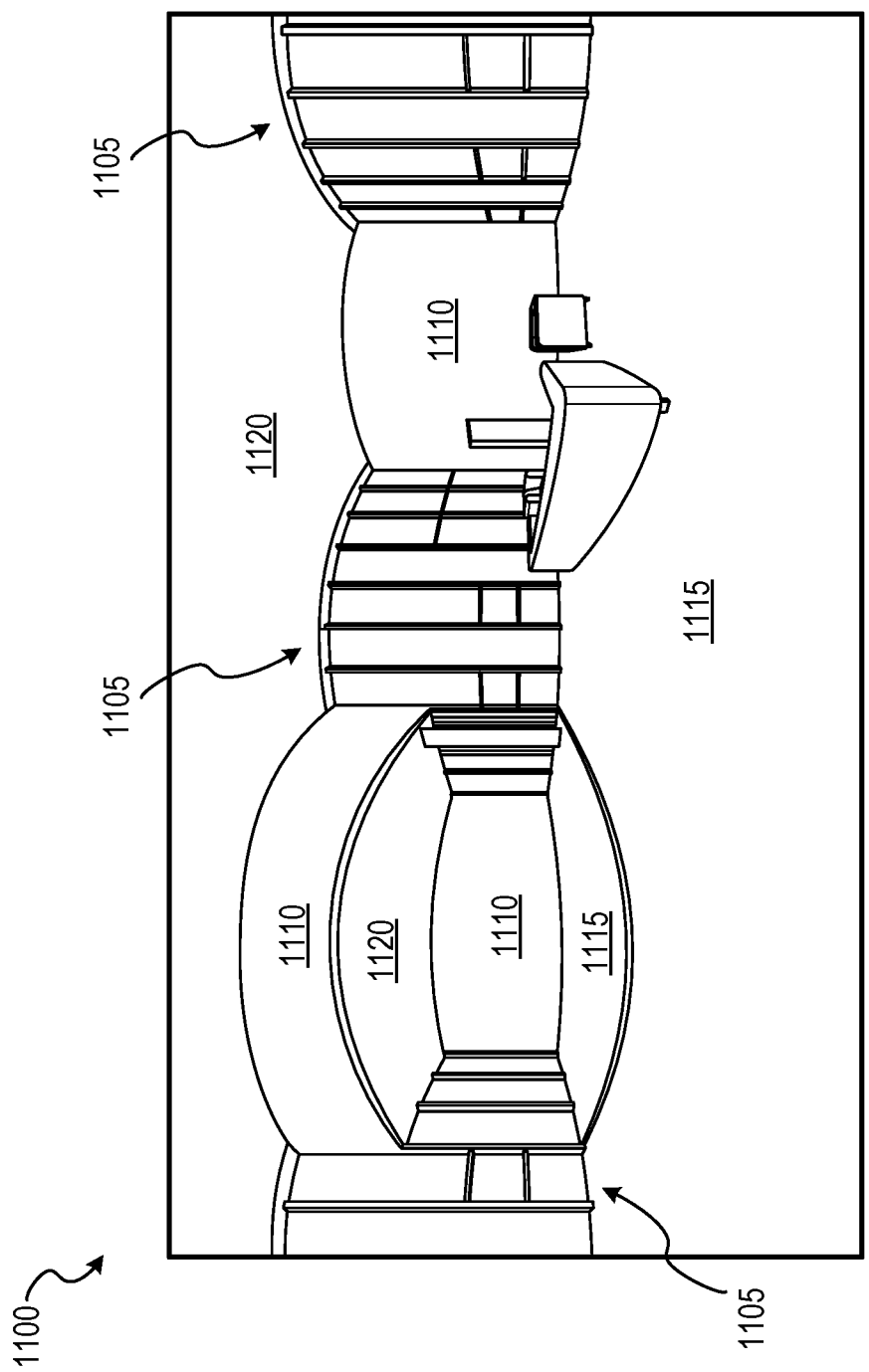
FIG. 11 shows an environment texture for use as an environment background, according to some example embodiments.

FIG. 11 shows an environment texture 1100 for use as an environment background, according to some example embodiments. As illustrated, the example texture is a spherical image (360° panorama) image of a real world environment (e.g., a posh living room). The depicted environment texture 1100 includes floor-to-ceiling windows 1105, walls 1110, a floor 1115, and a ceiling 1120. The environment texture 1100 can be generated as a high dynamic range (HDR) image, which combines multiple image captures to capture very light lights and very dark darks, as in understood in the art. Spherical HDR images can be generated using a camera settings or through post-production software (e.g., Adobe Photoshop®).

Although not depicted, sunlight is shining in through the windows 1105 thereby making the pixels that that correspond to the windows 1105 a lighter shade than the pixels that correspond to the walls 1110, the floor 1115, and the ceiling 1120. The environment texture 1100 (e.g., the HDR image of the living room), mapped to the 3D environment 910 (the sphere). The render engine 635 can be configured to use a ray tracing scheme (e.g., Mental Ray) to create lighting and reflection effects between the 3D model and the surrounding environment. That is, the 3D model may have a given texture (e.g., white skin, freckles) with set reflection values which reflect virtual rays emanating from light sources of the background (e.g., windows 1105).

The environment texture 1100 can be switched to create renders of the 3D model in different environments. For example, the environment texture 1100 may be a HDR image of the Grand Canyon. Thus, when the 3D renders are generated as training images, the 3D renders capture how the 3D hand would look in the simulated Grand Canyon. Then, according to some example embodiments, the texture of the 3D model can be switched (e.g., switching from a lighter shade skin to a darker shade skin), then again imaged in the Grand Canyon to capture how the 3D hand of a darker shade would look in the Grand Canyon. Further, the environment texture 1100 can then be switched to a different lighting environment to capture the hand (e.g., with the lighter shade skin applied, with the darker shade skin texture applied) in a different real-world environment, such as a night club (e.g., the Las Vegas Strip, inside a nightclub). In this way, different detailed training images can be created and the machine learning engine 630 can be trained on the rich set of training images without labeling the markers, without having to control the model (e.g., dog) to display different poses, and doing so in different environments (e.g., different lighting scenarios, different camera angles).

Figure 12:
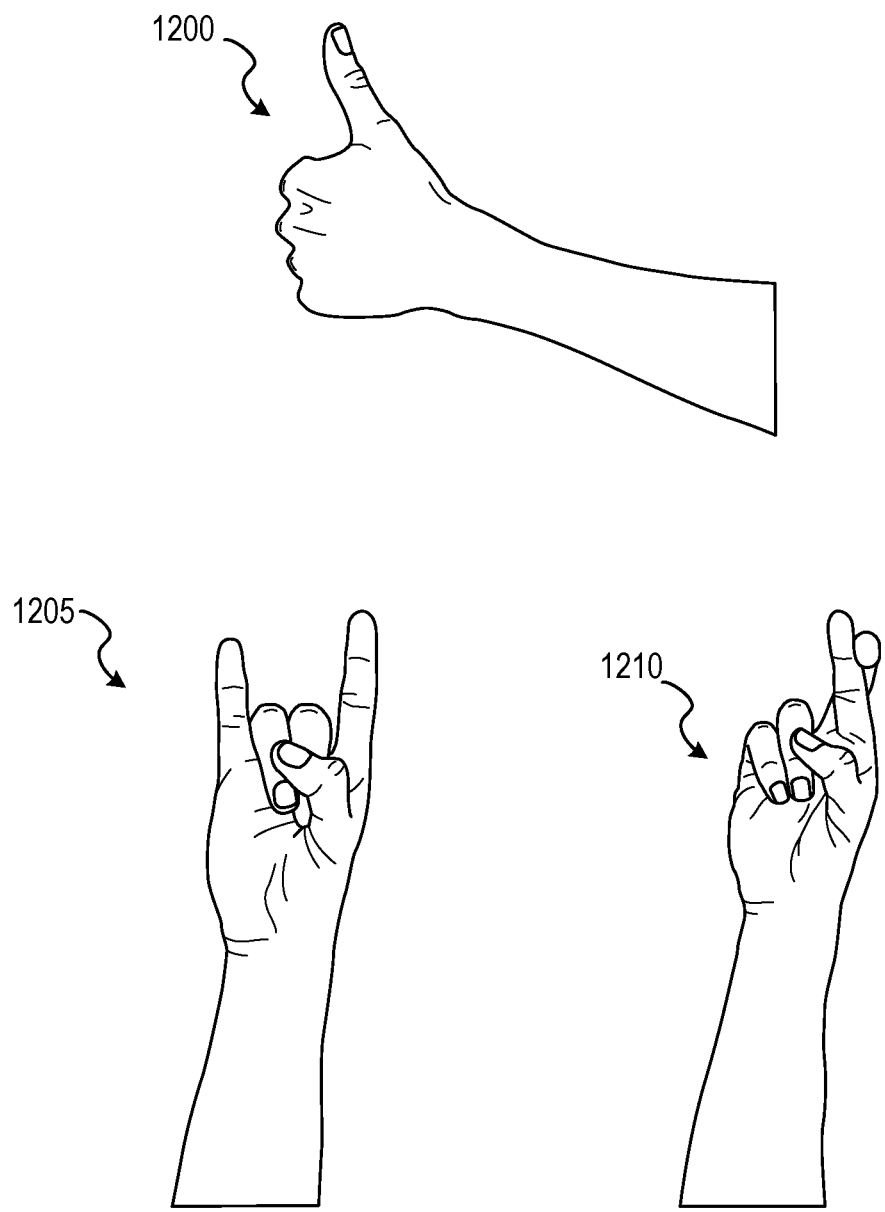
FIG. 12 shows example gestures of a 3D hand model, according to some example embodiments.

FIG. 12 shows example gestures of a 3D hand model, according to some example embodiments. The examples include a hand making a thumbs up gesture 1200, the hand making a rock-on gesture (also known as the Texas Longhorns sign), and a hand making a crossed-fingers gesture. As discussed, each hand can have markers that indicate key points (e.g., joints, tips of fingers) that can be automatically detected to train the machine learning engine 630. Each of the hands can also have different textures for different skin types, etc. Further, each of the hands with the different textures can be imaged (e.g., rendered) from different angles (e.g., from different virtual cameras 915-935 at different positions) in front of different backgrounds (e.g., spherical HDR images) that have different lighting effects. The classification model created by the machine learning engine 630 can then be applied to a wide range of images to more correctly classify gestures or poses of depicted subjects.

Figure 13:
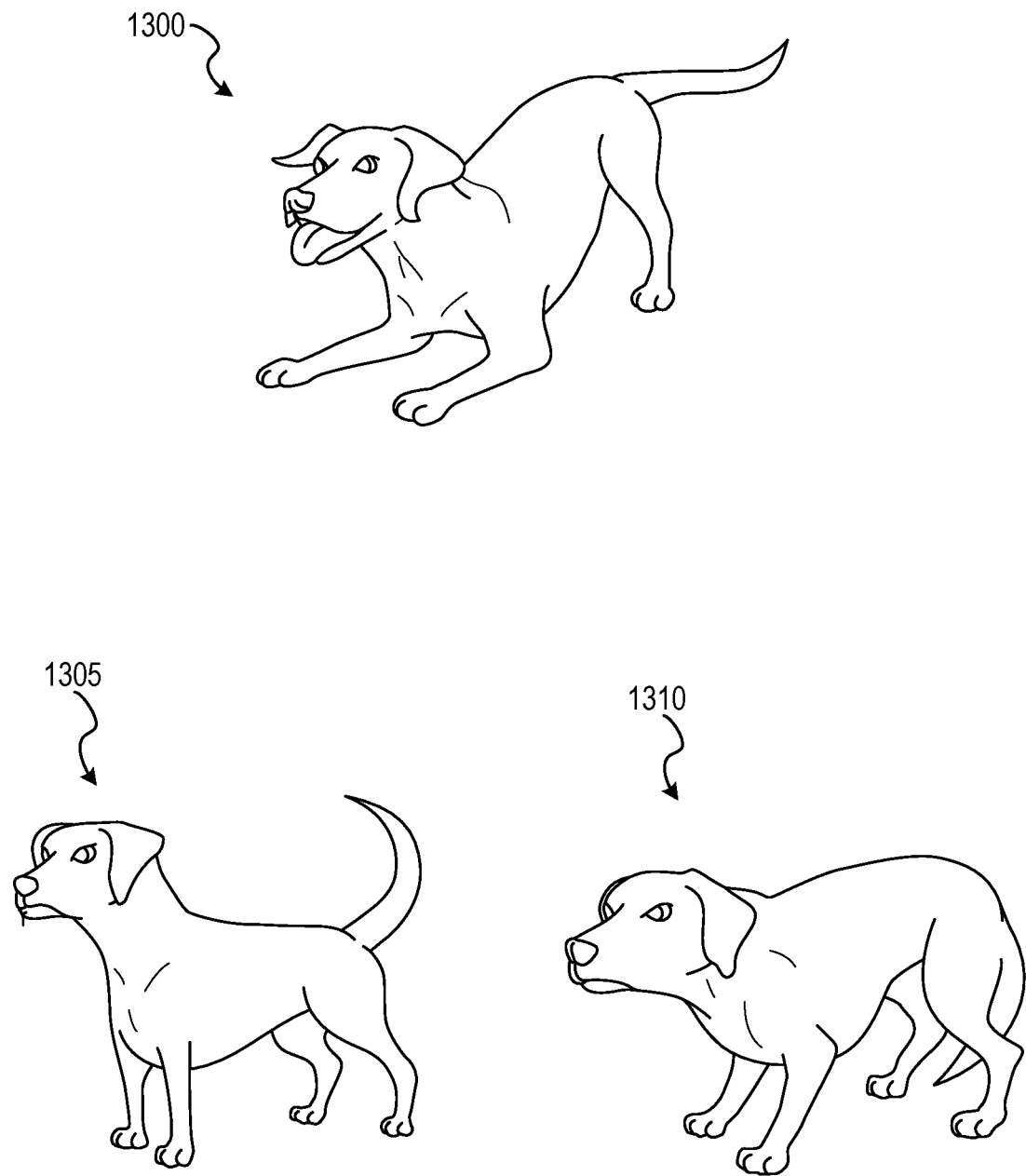
FIG. 13 shows example poses of a 3D Labrador retriever, according to some example embodiments.

FIG. 13 shows example poses of a 3D Labrador retriever, according to some example embodiments. The examples include the depicted dog in a playful pose 1300, the dog in an upright aggression pose 1305 with its tail erect, and the dog in a crouched pose with its tail down 1310. As discussed, each 3D model of the dog can have markers that indicate key points (e.g., feet location, eye location, tail location) that the machine learning engine 630 automatically identify to train its classification model. Each of the 3D dogs can also have different textures for different colors, fur types, fur patterns, fur hair cut designs. Further, each of the 3D dogs with the different textures can be imaged (e.g., rendered) from different angles (e.g., from different virtual cameras 915-935 at different positions) in front of different backgrounds (e.g., spherical HDR images) that have different lighting effects. In this way, the classification model created by the machine learning engine 630 can distinguish between dissimilar poses (e.g., pose 1300 where the dog is somewhat crouching, and pose 1305, where the dog is upright) and similar poses (e.g., pose 1300 where the dog is crouching but playful, and pose 1310 where the dog is crouching but likely aggressive).

Figure 14:
FIG. 14 shows a client device implementing the virtual object machine learning system, according to some example embodiments.

FIG. 14 shows a client device implementing the virtual object machine learning system 250, according to some example embodiments. In the example of FIG. 14, an image capture device on the back side of the client device 1400 has captured an image 1405 of a Labrador retriever. The machine learning engine 630 has previously been trained on the rich set of training images as discussed above. In some example embodiments, responsive to receiving the captured image, the machine learning engine 630 applies its trained classification model to the image 1405 to determine that the dog is in a playful pose. Responsive to the determination, the annotation system 206 overlays text 1410 that corresponds to the pose of the dog. For example, the annotation system 206 may overlay "Who's a good boy!?" on the image 1405. The image 1405 with the text 1410 can then be stored as a single image (e.g., merging the layers) and published online (e.g. to the social media system) as discussed above.

Figure 15:
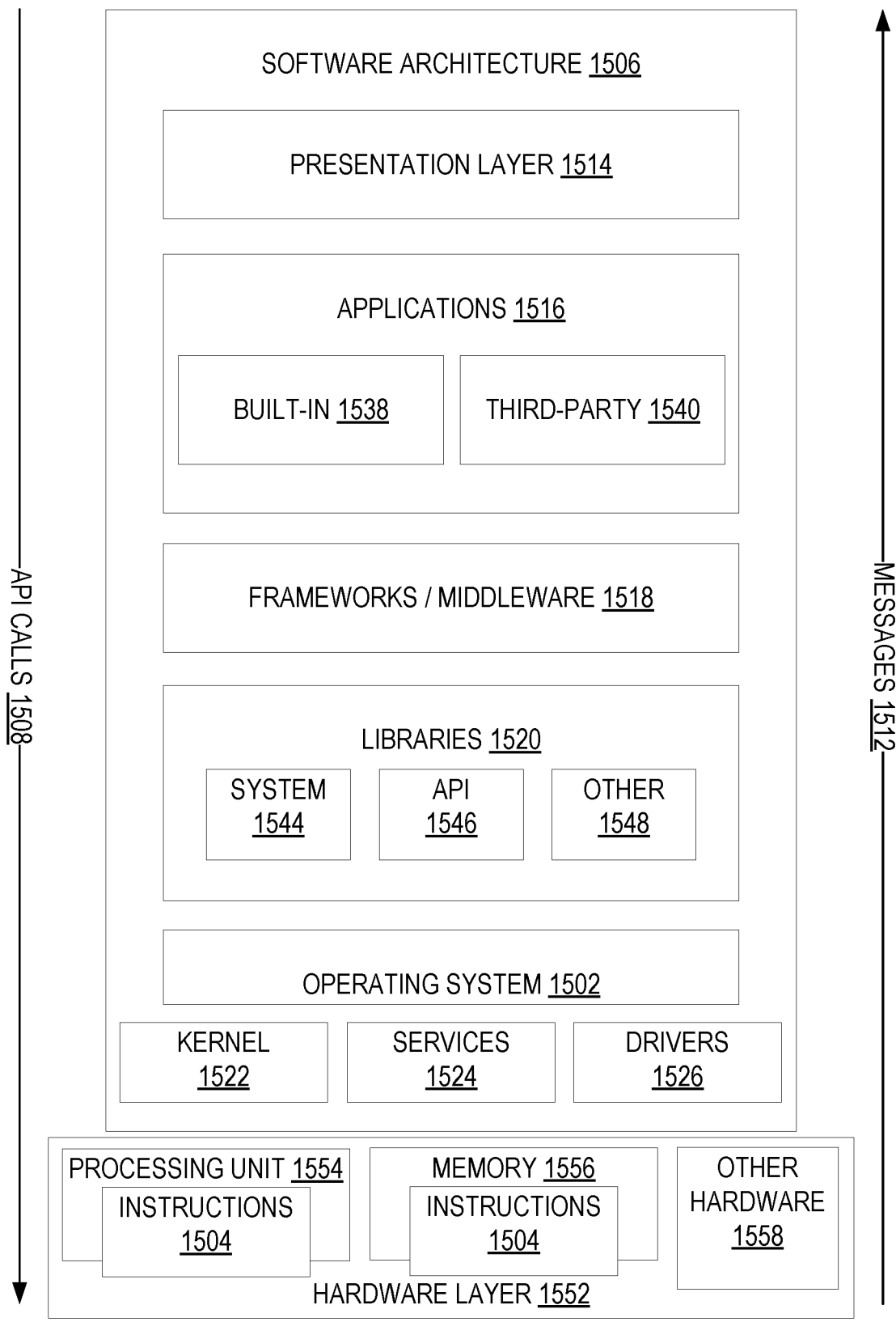
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors 1610, memory 1632, and I/O components 1650. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes memory and/or storage modules memory/storage 1556, which also have the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke application programming interface (API) calls 1508 through the software stack and receive a response in the form of messages 1512. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1515 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1515 and other software components/modules.

The frameworks/middleware 1518 provide a higher-level common infrastructure that may be used by the applications 1515 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1515 and/or other software components/modules, some of which may be specific to a particular operating system 1502 or platform.

The applications 1515 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1515 may use built-in operating system functions (e.g., kernel 1522, services 1524, and/or drivers 1526), libraries 1520, and frameworks/middleware 1518 to create user interfaces to interact with users of the system. Alternatively, or additionally, in some systems interactions with a user may occur through a presentation layer, such as the presentation layer 1514. In these systems, the application/component "logic" can be separated from the aspects of the application/component that interact with a user.

Figure 16:
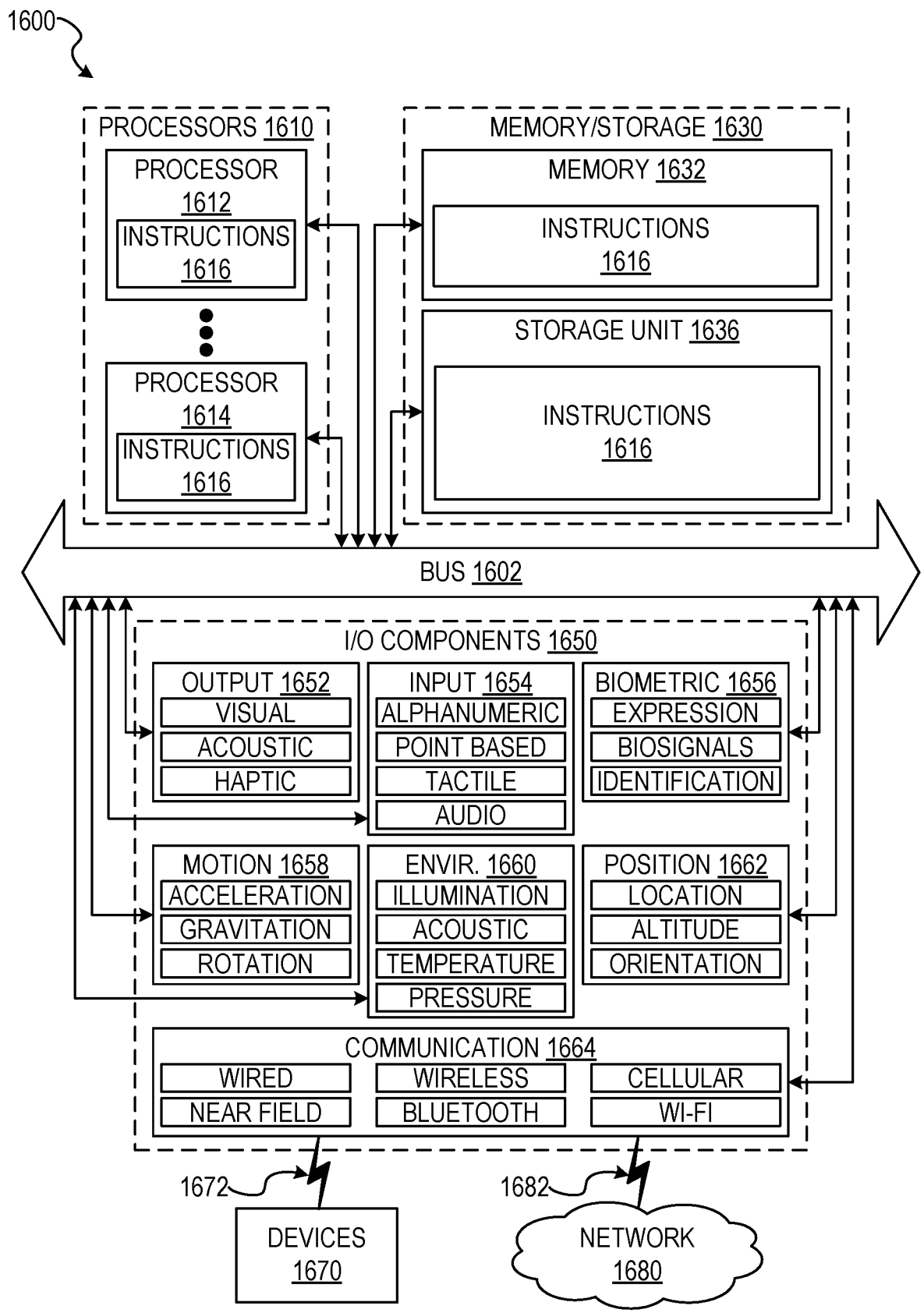
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610 having individual processors 1612 and 1614 (e.g., cores), memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1630 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672 respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF416, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
   storing, on a client device, a convolutional neural network trained to detect different gestures of an object, the convolutional neural network trained on a plurality of images of a three-dimensional model of the object, each of the plurality of images being a render of the three-dimensional model of the object in a different gesture;
   generating, using an image sensor of the client device, an image depicting a physical object;
   classifying, using the convolutional neural network, the physical object as being in a gesture by applying the convolution neural network to the generated image depicting the physical object;
   displaying with the image, on a display device of the client device, additional content associated with the identified gesture of the physical object; and
   publishing, to a network platform, the additional content and the image as an ephemeral message.

2. The method of claim 1, wherein the additional content is overlay content associated with the identified gesture of the physical object in the image.

3. The method of claim 1, wherein the convolutional neural network is trained on a network platform.

4. The method of claim 3, further comprising:
   receiving, from the network platform, the convolutional neural network that is trained on the plurality of images.

5. The method of claim 1, wherein the plurality of images are rendered from a plurality of virtual cameras that view the three-dimensional model of the object from different perspectives.

6. The method of claim 1, wherein the physical object is a human hand and the different gestures depicted in the plurality of images used to train the convolutional neural network depict different human hand gestures.

7. The method of claim 1, wherein the physical object is a human head and the different gestures depicted in the plurality of images used to train the convolutional neural network depict different human head gestures.

8. The method of claim 1, wherein the physical object is an animal body and the different gestures depicted in the plurality of images used to train the convolutional neural network depict different animal body gestures.

9. The method of claim 8, wherein the object has a fur texture of an animal.

10. The method of claim 1, wherein the object has a skin shade texture.

11. The method of claim 10, wherein the plurality of images include a set of images depicting the three-dimensional model of the object with a light skin shade texture arranged in the different gestures.

12. The method of claim 11, wherein the plurality of images include another set of images depicting the three-dimensional model of the object with a dark skin shade texture arranged in the different gestures.

13. A client device comprising:
one or more processors;
an image sensor;
a display device; and
a memory storing instructions that, when executed by the one or more processors, cause the client device to perform operations comprising:
store a convolutional neural network trained to detect different gestures of an object, the convolutional neural network trained on a plurality of images of a three-dimensional model of the object, each of the plurality of images being a render of the three-dimensional model of the object in a different gesture;
generate, using the image sensor, an image depicting a physical object;
classify, using the convolutional neural network, the physical object as being in a gesture by applying the convolution neural network to the generated image depicting the physical object;
display with the image, on the display device, additional content associated with the identified gesture of the physical object; and
provide, to a network platform, the additional content and the image as an ephemeral message.

14. The client device of claim 13, wherein the additional content is overlay content associated with the identified gesture of the physical object in the image.

15. The client device of claim 13, wherein the convolutional neural network is trained on a network platform.

16. The client device of claim 15, further comprising:
receiving, from the network platform, the convolutional neural network that is trained on the plurality of images.

17. The client device of claim 13, wherein the plurality of images are rendered from a plurality of virtual cameras that view the three-dimensional model of the object from different perspectives.

18. A non-transitory machine-readable storage device embodying instructions that, when executed by a machine, cause the machine to perform operations comprising:
store a convolutional neural network trained to detect different gestures of an object, the convolutional neural network trained on a plurality of images of a three-dimensional model of the object, each of the plurality of images being a render of the three-dimensional model of the object in a different gesture;
generate, using the image sensor, an image depicting a physical object;
classify, using the convolutional neural network, the physical object as being in a gesture by applying the convolution neural network to the generated image depicting the physical object;
display with the image, on the display device, additional content associated with the identified gesture of the physical object; and
provide, to a network platform, the additional content and the image as an ephemeral message.

* * * * *